May 14, 1963  WONG WING CHEUNG  3,089,777
METHOD OF PRESERVING DUCK CARCASSES
Filed May 17, 1961

United States Patent Office

3,089,777
Patented May 14, 1963

3,089,777
METHOD OF PRESERVING DUCK CARCASSES
Wong Wing Cheung, 73 Embassy Court,
Hong Kong
Filed May 17, 1961, Ser. No. 110,760
1 Claim. (Cl. 99—157)

The invention relates in general to a method of preserving fowl carcasses and more particularly to a kiln room method of preserving ducks.

The existing method of preserving ducks in Hong Kong consists of drying the duck carcasses (defeathered and eviscerated) in the sun and then baking them over charcoal fires, salt and oil having been added as supplementary preservatives. The disadvantages of this method are that the method is unhygienic and that it is slow and seasonal. The dry, warm weather necessary for the success of this method of operation only occurs in the winter months in Hong Kong (approximately October–March).

An object of the invention is to provide a method for preserving ducks by salting, oiling and spicing carcasses that are then heat dried in all seasons of the year.

Another object of the invention is to increase the number of ducks that can be dried by an improved method in an available space over the number that can be dried in the same amount of space in the sun.

Another object of the invention is to provide a method for heat drying ducks that is completed entirely indoors under controlled hygienic conditions.

Other objects and a fuller understanding of the invention may be had by referring to the following description and claim taken in conjunction with the accompanying drawings, in which:

Figure 1:
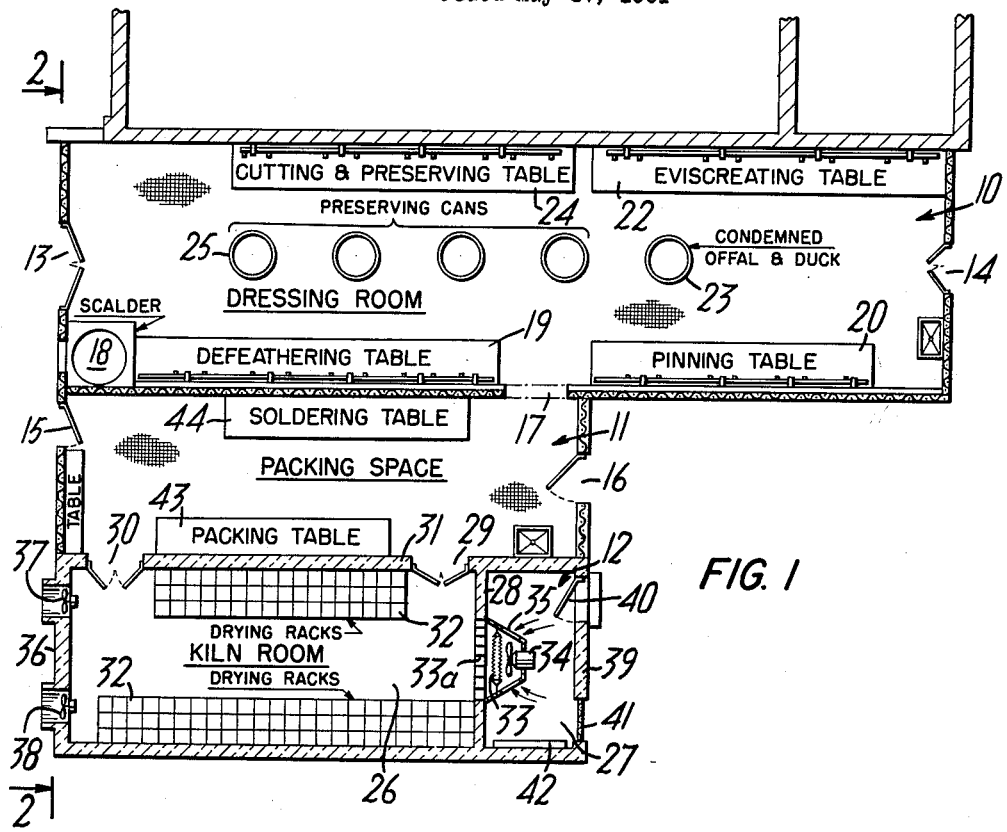
FIG. 1 is a plan view of the plant used in preserving the ducks.
Figure 2:
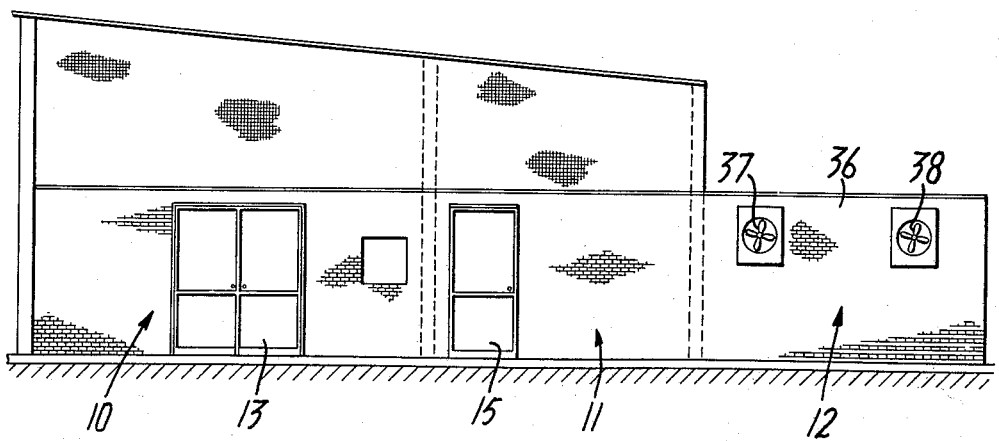
FIG. 2 is a side elevation of the plant of FIG. 1.

Referring to FIG. 1 a duck processing plant comprises three interconnecting rooms 10, 11 and 12 that are positioned side by side, each room preferably having a side wall in common with the adjacent room. Processing room 10 and packing room 11 are tile floored and defined by brick walls, preferably about five inches thick and seven feet high that are interiorly lined with tile for ease in washing and keeping clean. A roof is supported vertically spaced above and overhanging the walls, the vertical space between the roof and walls is closed by screen to provide light and ventilation and keep out dirt and insects. Doors 13 and 14 are provided in the respective end walls of room 10 and doors 15 and 16 in the respective end walls of room 11. An interconnecting doorway 17 in the common side wall joins rooms 10 and 11.

Killed ducks are introduced into room 10 through door 13. A scalder 18 is provided at one side of door 13 into which the ducks are placed for a few minutes to loosen their feathers. A defeathering table 19 is provided adjoining the scalder where the ducks are defeathered. Pin feathers are separately removed at an adjacent pinning table 20. An eviscerating table 22 is positioned opposite the table 20 where the fowl is eviscerated and cleaned. A galvanized can 23 is placed between tables 20 and 22 for receiving discarded offal and any fowl showing signs of injury or spoilage that could be dangerous to a consumer. A cutting and preserving table 24 is arranged opposite the table 19 with galvanized iron preserving cans 25 therebetween. The ducks are salted, oiled and spiced at table 24 and placed in preserving cans 25 preparatory to transporting to room 12 for drying.

Room 12 comprises a drying kiln 26 and a control chamber 27 separated by an interior transverse wall, 28. The kiln 26 is a tiled chamber connected to room 11 through spaced doors 29 and 30 in a common wall 31. The fowl are respectively introduced and removed from the kiln 26 through doors 29 and 30. A plurality of racks 32 are spaced vertically apart, preferably about nine inches, and arranged in the kiln in banks extending for preferably about six feet in height.

An electrical heater 33 is mounted behind a grill in the transverse wall 28, and a blower 34 positioned adjacent the heater 33 to blow air through the heater 33 and grill 33a. Both heater and blower are enclosed in a vented conduit 35 in control chamber 27 for blowing into the kiln 26 an air blast at a temperature within the range of 100° F. to 120° F. The exterior end wall 36 of the kiln 26 has openings and exhaust fans 37 and 38 mounted in the openings for exhausting the hot air blown into the kiln from the other end. The exterior end wall 39 of the control chamber 27 has a closable doorway 40 and a ventilation opening 41. A switch board 42 is provided in the control room for individually operating the heater, blower and the exhaust fans.

Ducks prepared in the process room 10 are brought through doors 17 across the packing room 11 and out door 29 into the kiln. There the fowl are arranged on the racks. Doors 29 and 30 are closed and the heater 33, blower 34 and exhaust fans 37 turned on for a period of approximately four hours. The heater 33 is then turned off and comparatively cool non-heated air is circulated through the room and out of the exhaust openings for a period of approximately eight hours. The heater 33 is then turned on again for a second period of four hours to complete the drying process of the fowl. The exhaust fan is designed and operated at a speed to change the air in the kiln about 20 times an hour. The intermediate step of circulating cool non-heated air through the hot kiln increases the efficiency of the drying and the whole preservation process. It has been found that the cooling step results in faster and more uniform drying, and improved flavor in the product. The hot air is humid so that by using hot air alone the process of dehydration will take longer and the carcasses will always contain a percentage of moisture, which might result in their not being so well preserved. Furthermore, it has been found that exposing the carcasses to hot air only causes a loss of flavor which can be avoided by the process described.

After the final heat drying the ducks are allowed to remain in the kiln 26 without hot or cold air being circulated until cool. They are then removed from the kiln 26 through door 30 into packing room 11. A packing table 43 is arranged against wall 31 between doors 29 and 30. The ducks are packed at table 43 in containers brought in through door 15. A soldering table 44 against the opposite wall from the packing table 43 is provided for sealing the containers, which are then taken through door 16 for distribution to market.

Although I have described my invention with a certain degree of particularily, it is understood that the present disclosure has been made only by way of example and that numerous changes in the details of construction and arrangement of parts may be resorted to without departing from the spirit and the scope of the invention as hereinafter claimed.

What I claim and desire to secure by Letters Patent is:

The method of drying and preserving duck carcasses comprising: the steps of salting, oiling and spicing fresh defeathered and eviscerated duck carcasses; the step of initially kiln drying said treated carcasses with circulating air heated to a temperature between 100° F.–120° F. for a period of approximately four hours at a constant rate to change the air in the kiln about twenty times an hour; the intermediate step of drying said carcasses by circulating therearound at said constant rate cool unheated air for a further period of about eight hours; the step of completing the drying of said carcasses by circulating air heated to a temperature between 100° F.–120° F. for a second period of four hours at said constant rate; and then cooling said carcasses in said kiln, whereby said duck carcasses are preserved with improved flavor at an accelerated rate and with uniform results.

References Cited in the file of this patent

UNITED STATES PATENTS

| | | |
|---|---|---|
| 396,344 | Street | Jan. 15, 1889 |
| 1,746,100 | Bruens | Feb. 4, 1930 |

OTHER REFERENCES

"How To Cook and Eat in Chinese," 1949, by B. Y. Chao, published by The John Day Company, New York, page 100.